United States Patent
Wojtalewicz et al.

(10) Patent No.: US 11,459,478 B2
(45) Date of Patent: Oct. 4, 2022

(54) COATING COMPOSITIONS CONTAINING A HYDROPYPHENYL FUNCTIONAL POLYMER AND A LATEX POLYMER

(71) Applicant: Akzo Nobel Coatings International B.V., Arnhem (NL)

(72) Inventors: Jennifer Wojtalewicz, Berea, OH (US); Alexander Polykarpov, Brunswick, OH (US)

(73) Assignee: Akzo Nobel Coatings International B.V., Amsterdam (NL)

( * ) Notice: Subject to any disclaimer, the term of this patent is extended or adjusted under 35 U.S.C. 154(b) by 511 days.

(21) Appl. No.: 16/498,219

(22) PCT Filed: Apr. 3, 2018

(86) PCT No.: PCT/EP2018/058480
§ 371 (c)(1),
(2) Date: Sep. 26, 2019

(87) PCT Pub. No.: WO2018/185094
PCT Pub. Date: Oct. 11, 2018

(65) Prior Publication Data
US 2021/0102085 A1   Apr. 8, 2021

Related U.S. Application Data

(60) Provisional application No. 62/483,007, filed on Apr. 7, 2017.

(30) Foreign Application Priority Data

May 16, 2017   (EP) ..................... 17171373

(51) Int. Cl.
| | | |
|---|---|---|
| *C09D 125/18* | (2006.01) | |
| *B65D 25/14* | (2006.01) | |
| *C08K 5/00* | (2006.01) | |
| *C08K 5/20* | (2006.01) | |
| *C09D 133/12* | (2006.01) | |
| *C09D 133/02* | (2006.01) | |
| *C09D 4/06* | (2006.01) | |
| *C08L 25/00* | (2006.01) | |

(52) U.S. Cl.
CPC .......... *C09D 125/18* (2013.01); *B65D 25/14* (2013.01); *C08K 5/0025* (2013.01); *C08K 5/20* (2013.01); *C08L 25/00* (2013.01); *C09D 4/06* (2013.01); *C09D 133/02* (2013.01); *C09D 133/12* (2013.01)

(58) Field of Classification Search
CPC .. C09D 133/02; C09D 133/12; C09D 125/18; C09D 4/06; B65D 25/14; C08K 5/20; C08K 5/0025; C08L 25/00
See application file for complete search history.

(56) References Cited

U.S. PATENT DOCUMENTS

| | | | |
|---|---|---|---|
| 5,139,834 A | 8/1992 | Cole | 428/35.8 |
| 5,554,719 A | 9/1996 | Sounik | 528/212 |
| 6,086,991 A | 7/2000 | Hubbard et al. | 428/336 |
| 6,646,041 B2 | 11/2003 | St. John Williams et al. | 524/522 |
| 7,262,261 B2 | 8/2007 | Brindöpke et al. | 528/107 |
| 7,566,752 B2 | 7/2009 | Sheehan et al. | 525/118 |
| 9,181,448 B2 | 11/2015 | Li et al. | 133/4 |
| 9,394,456 B2 | 7/2016 | Rademacher et al. | 133/68 |
| 9,404,006 B2 | 8/2016 | Li | 123/869 |
| 2013/0281574 A1 | 10/2013 | Li et al. | 133/4 |
| 2015/0344737 A1 | 12/2015 | Bode et al. | 197/5 |
| 2015/0376435 A1 | 12/2015 | Youlton et al. | |
| 2016/0024337 A1 | 1/2016 | Bode et al. | 167/6 |
| 2020/0190352 A1 | 6/2020 | Youlton et al. | C09D 13/00 |

FOREIGN PATENT DOCUMENTS

| | | | |
|---|---|---|---|
| CN | 105121569 A | 12/2015 | ........... C09D 161/06 |
| EP | 0365479 A2 | 4/1990 | ............ C08G 59/18 |
| EP | 0373911 A1 | 6/1990 | ............ C08L 33/06 |
| EP | 0530896 A2 | 3/1993 | ............ C08L 677/00 |
| EP | 1325088 B1 | 7/2003 | ............ C09D 5/02 |
| EP | 0860541 B1 | 5/2005 | ......... D06M 13/224 |
| EP | 1756191 B1 | 2/2007 | ......... C09D 125/18 |
| JP | 07090612 A | 4/1995 | ............ C23C 22/34 |
| JP | 2006328369 | 4/2005 | ............ C08L 67/00 |
| RU | 2598440 C2 | 2/2015 | ......... C09D 191/00 |
| RU | 2591153 C2 | 2/2016 | ......... C09D 133/06 |
| WO | 97/47694 A1 | 1/1997 | ............ C09D 1/02 |

(Continued)

OTHER PUBLICATIONS

Gelorme, Jeffrey D.; Kosbar, Laura L.; Graham, Teresita O.; Afzali-Kushaa, Ali; Houlihan, Francis M. (2000). SPIE Proceedings [SPIE Microlithography 2000—Santa Clara, CA (Sunday Feb. 27, 2000)] Advances in Resist Technology and Processing XVII, Synthesis, and lithographic performance of poly-4-hydroxphenyl-ethyl-methacrylate-based negative resists, 3999(), 559-568.doi:10.1117/12.388340 (Publication Date: Dec. 31, 2000).
Derwent Abstract of JP07090612A.
Takahashi Asao et al., P-vinyl phenol polymer. A highly heat resistant new material for insulation, EIC 13th Electrical/Electronics Insulation Conference (IEEE 1977 EIC 13th Electrical/Electronics Insualation Conference—Chicago, IL, USA (9177.9.26-1977.9.9)] 1977, pp. 252-256.
English Abstract of JP2006328369-A, dated Apr. 26, 2006.

(Continued)

*Primary Examiner* — Angela C Scott (57) ABSTRACT

Coating compositions comprising a hydroxyphenyl functional polymer, a latex polymer, a cross linker, and one or more solvents, and optionally a dispersant, a lubricant and/or one or more pigments are disclosed. In some embodiments the compositions can be used to coat substrates such as cans and other packaging for food and beverages. The coating compositions of the disclosure show favorable flavor scalping properties.

12 Claims, 3 Drawing Sheets

(56) References Cited

FOREIGN PATENT DOCUMENTS

| WO | 97/47678 A1 | 12/1997 | ................ C08J 7/04 |
|----|----|----|----|
| WO | 2005/113634 A1 | 12/2005 | ............. C08G 61/02 |
| WO | 2006/052380 A1 | 5/2006 | ............. C08G 61/00 |
| WO | 2012/089746 A1 | 7/2012 | ........... C09D 191/00 |
| WO | 2013/079719 A1 | 6/2013 | ............... B65D 1/12 |
| WO | 2013/098218 A1 | 7/2013 | ........... C09D 133/14 |
| WO | 2016/196174 A1 | 12/2016 | ........... C09D 133/00 |
| WO | 2016/196190 A1 | 12/2016 | ............... C09D 5/02 |

OTHER PUBLICATIONS

Search Report for corresponding EP Application No. 17171373.8, dated Oct. 9, 2017.
Search Report and Written Report for corresponding International Application No. PCT/EP2018/058480, dated Jul. 6, 2018.
Ying Tang, et al., "Synthesis and Application of Poly-p-vinylphenol," Liaoning Chemical Industry, 1996, pp. 11-13.
English Translation of Ying Tang, et al., "Synthesis and Application of Poly-p-vinylphenol," Liaoning Chemical Industry, 1996, pp. 11-13.

COATING COMPOSITIONS CONTAINING A HYDROPYPHENYL FUNCTIONAL POLYMER AND A LATEX POLYMER

This application is a national stage filing under 35 U.S.C. § 371 of PCT/EP2018/058480, filed Apr. 3, 2018, which claims priority to European Patent Application No. 17171373.8, filed May 16, 2017, and U.S. Provisional Patent Application No. 62/483,007, filed on Apr. 7, 2017, the contents of which are incorporated herein by reference in their entirety.

BACKGROUND OF THE INVENTION

Field of the Invention

The present disclosure relates to coating compositions comprising a hydroxyphenyl functional polymer, a latex polymer, a cross linker, and optionally one or more solvents, a dispersant, a lubricant and/or one or more pigments, methods of preparing the foregoing compositions, methods of preparing substrates coated with the foregoing compositions, and substrates coated with the foregoing compositions, particularly metal substrates.

Description of the Related Art

Coating compositions are used on the surface of food and beverage packaging substrates to protect the contents of the packaging from, for example, contamination of the food or beverage due to corrosion of the packaging by its contents. Care must also be taken to avoid the loss of flavor from the food or beverage into the substrate. The loss of flavor from the food or beverage into the substrate, known as flavor scalping, arises from the migration of volatile flavorants in the packaged food or beverage into the coating on the surface of the packaging substrate.

Coating compositions formed from epoxy resins have been used to coat packaging and containers for foods and beverages. Although the weight of scientific evidence as interpreted by the major global regulatory food safety agencies in the US, Canada, Europe, and Japan, shows that the levels of bisphenol A (BPA) consumers are exposed to with current commercial epoxy based coatings is safe, there is nonetheless consumer concern over the possible migration of BPA into the food or beverage, making coatings that do not contain BPA or any other endocrine disruptors preferred.

Thus, there is a need to produce coating compositions that do not contain, or are substantially free, of bisphenol A or other bisphenols, and do not affect the flavor of the food or beverage within the coated container.

SUMMARY OF THE INVENTION

We have surprisingly discovered that coating compositions comprising a hydroxyphenyl functional polymer and a latex polymer impart favorable flavor scalping properties, while avoiding materials that are disfavorable to consumers. Accordingly, the present disclosure provides a coating composition comprising a hydroxyphenyl functional polymer, a latex polymer, crosslinker, and optionally one or more solvents, a dispersant, a lubricant and/or one or more pigments.

The present disclosure provides an alternative to epoxy based coatings that is substantially free of formaldehyde, bisphenols, isocyanates, phthalates, and organotins. Particularly, the coating compositions disclosed herein preferably do not contain, or are substantially free, of bisphenol A or other bisphenols.

The present disclosure also provides a coating composition comprising a hydroxyphenyl functional polymer and a latex polymer, wherein when the coating composition is applied onto a substrate to form a coating layer, the hydroxyphenyl functional polymer is not homogenously dispersed throughout the coating layer.

The present disclosure also provides methods of preparing the foregoing compositions. Also provided are methods of preparing substrates coated with the foregoing compositions, and substrates coated with the foregoing compositions, particularly metal substrates.

The coating compositions of the disclosure are useful for a variety of applications, including but not limited to coatings for food and beverage packaging and for metal packaging such as aerosol cans, paint cans, and industrial drums.

DETAILED DESCRIPTION OF THE INVENTION

In a first embodiment, the present disclosure provides a coating composition with the surprising benefit of favorable flavor scalping properties without the use of bisphenols and other materials that are disfavorable to consumers. The compositions of the present disclosure comprise a hydroxyphenyl functional polymer, a latex polymer, a crosslinker, and optionally one or more solvents, a dispersant, a lubricant and/or one or more pigments. In another aspect, the present disclosure provides a coated substrate comprising at least a layer of the coating composition. In yet another aspect, the present disclosure provides a method of preparing a coated substrate comprising applying and curing a layer of the composition onto the surface of a substrate.

By "hydroxyphenyl functional polymer," it is meant any polymer comprising phenolic groups. The term "hydroxyphenyl functional polymer" also encompasses polymers comprising functionalized phenolic groups. The hydroxyphenyl functional polymer may be a homopolymer or a copolymer. The hydroxyphenyl functional polymer used in the compositions of the disclosure may be a single polymer type or a combination of two or more polymer types. In one approach, the hydroxyphenyl functional polymer of the coating composition does not comprise a phenol formaldehyde resole.

The hydroxyphenyl functional polymer may be functionalized with one or more functional groups. Exemplary functional groups include: acetal, acrylate, methacrylate, aldehyde, alkyl, alkoxy, amide, aryl, carbamate, carboxylate, halogen, hydroxyalkyl, hydroxyalkyl amide, oxazoline, azlactone, hydroxyl, isocyanate, ketone, methacrylate, nitrile, nitro, sulfide, sulfone, thiol, urethane, alkylvinyl, and vinyl.

The hydroxyphenyl functional polymer may be a catechol functional polymer, a Novolac, such as a Novolac phenolic resin, a hydroxyphenyl functional polymer with a Novolac-like structure, a poly(hydroxyphenol) compound, or a polyphenol.

In certain embodiments, the hydroxyphenyl functional polymer is poly(hydroxystyrene). The poly(hydroxystyrene) can be linear or it can be branched. Linear poly(hydroxystyrene) can for example be obtained by free radical polymerization of hydroxystyrene or its derivative(s). Branched poly(hydroxystyrene) can also be obtained by free radical polymerization from hydroxystyrene or its derivative(s) but also via cationic polymerization. Preferred hydroxystyrene monomer is 4-hydroxystyrene, also known as 4-vinylphenol. However other hydroxystyrenes or mixtures thereof can also be used as monomer(s) for obtaining the poly(hydroxystyrene) suitable in this disclosure. The poly(hydroxystyrene) may comprise linear and/or branched poly(hydroxystyrene). In certain embodiments, the poly(hydroxystyrene) can be a physical blend of linear poly(hydroxystyrene) and branched poly(hydroxystyrene), whereas in other embodiments the poly(hydroxystyrene) can be a polymeric structure comprising both linear and branched poly(hydroxystyrene). In one embodiment, the poly(hydroxystyrene) has a Novolac-like structure. Suitable poly(hydroxystyrene)s are for example disclosed in EP175619161.

In one example, the branched polyhydroxystyrene is a homopolymer of 4-hydroxyphenylmethylcarbinol. The polymer of 4-hydroxyphenylmethylcarbinol contains branched moieties as illustrated below. Such a polyhydroxystyrene oligomer has a Novolak type structure even though it is not produced from formaldehyde.

Exemplary poly(hydroxystyrene) polymers that can be used to prepare the coating compositions of the disclosure include PB5 (Hydrite Chemical Co. Brookfield Wis.), solutions of poly(hydroxystyrene) in any alcohol, for example methanol, ethanol, butanol, propanol, and isopropanol, and PBSW (Hydrite Chemical Co., Brookfield, Wis.). Poly(hydroxystyrene) polymers may be obtained commercially, or may be prepared by methods known in the art (see, e.g., U.S. Pat. Nos. 5,554,719 and 7,566,752).

The hydroxyphenyl functional polymer may have a number average molecular weight ($M_a$) as measured by GPC of 300 Da, 500 Da, 700 Da, 900 Da, 1000 Da, 1200 Da, 1400 Da, 1600 Da, 1800 Da, 2000 Da, 2200 Da, 2400 Da, 2600 Da, 2800 Da, 3000 Da, 3200 Da, 3400 Da, 3600 Da, 3800 Da, 4000 Da, 4200 Da, 4400 Da, 4600 Da, 4800 Da, or 5000 Da. As used herein, when a series of specific values of a parameter are given (for example the number average molecular weight of the hydroxyphenyl functional polymer in the coating compositions disclosed herein), it is intended to include each value as well as ranges between any two values. So, for example, the $M_n$ of the hydroxyphenyl functional polymer may be 1000 Da, or greater, such as 1000-5000 Da. In certain embodiments, the hydroxyphenyl functional polymer may have an $M_n$ of 500-3000 Da, of 1000-3000 Da, of 2000-4000 Da, of 2000-3000 Da, of 2200-2800 Da, or of 2400-2800 Da, etc. In one approach, the Mn is greater than about 2000 Da., such as greater than 2500 Da. In some instances, 15% or less, 14% or less, 13% or less, 12% or less, 11% or less, 10% or less, 9% or less, 8% or less, or 7% or less of the hydroxyphenyl functional polymer has a molecular weight of less than 1000 Da.

In one approach, the hydroxyphenyl functional polymer may have a polydispersity from about 1 up to about 3, from about 1 up to about 2.5, or from about 1 up to about 2.

The hydroxyphenyl functional polymer may be present in the coating compositions of the disclosure in 0.1%, 0.5%, 1%, 2%, 3%, 4%, 5%, 6%, 7%, 8%, 9%, or 10% by weight of the coating compositions, or ranges between any two of these values. For example, the hydroxyphenyl functional polymer may be present in the coating compositions in 0.1%-10% by weight, in 1%-10% by weight of the coating composition, in 2%-8% by weight, in 1%-5% by weight, in 1%-3% by weight, or in 1%-2% by weight of the coating composition.

The latex polymer used in the coating compositions disclosed herein may be a homopolymer or it may be a copolymer. The latex polymer used in the compositions of the disclosure may also be a single homopolymer, a single copolymer, a mixture of two or more homopolymers, a mixture of two or more copolymers, or a mixture of one or more homopolymers with one or more copolymers.

The latex polymer means herein a polymer capable of forming an aqueous dispersion (latex). The polymer used in the present disclosure is preferably an addition polymer formed from ethylenically unsaturated monomers. In certain embodiments, the latex polymer is (meth)acrylic or a styrene (meth)acrylic latex polymer. Preferably, the polymer is a (meth)acrylic polymer.

The (meth)acrylic polymer is preferably formed from the following monomers: acrylic and methacrylic acid and esters thereof, including, but not limited to, acrylic acid, methacrylic acid (MAA), methyl methacrylate (MMA), butyl acrylate (BA), hydroxypropyl methacrylate (HPMA), allyl methacrylate (AMA), ethylene glycol dimethylacrylate (EGDMA), cyclohexyl methacrylate (CHMA), n-butyl methacrylate (nBMA), glycidyl methacrylate (GMA), benzyl methacrylate (BMA), 1,3-butanediol dimethacrylate (BDDMA), glycerol dimethacrylate (GDMA), and isobornyl methacrylate (IBOMA).

It is preferred to use the polymer in the form of an aqueous dispersion (latex), wherein polymers are made by emulsion polymerisation. Typically such a process involves the addition polymerisation of substantially water immiscible ethylenically unsaturated monomers using a water soluble polymerisation initiator in water. On raising the temperature, polymerisation takes place in the water phase producing substantially water insoluble polymer which, as polymerisation proceeds, increases in molecular weight until it becomes completely insoluble in the water and consequently precipitates to form a particle. In order to make such polymers as stable dispersions it is well known that water soluble surfactants are required to emulsify the monomers to be polymerised and subsequently to stabilise the resulting polymer particles as they are formed, otherwise the polymer particles will form coarse agglomerates, which cannot be formulated into useful products.

In certain embodiments, the latex polymer is used in the form of a nanogel latex. Such nanogels are described in, e.g., EP 1325088B1 and U.S. Pat. No. 6,646,041, the contents of which are incorporated herein by reference. Nanogel latexes allow for highly water resistant, stable aqueous dispersions of addition polymer particles to be made without using surfactants. This is achieved by using stabilizing solution copolymers containing amounts of crosslinking species which are significantly higher than previously proposed. A solution copolymer, such as an acrylic copolymer, when employed as the sole stabilizer, can serve as the replacement for the surfactant in an emulsion polymerization. Thus, in some approaches, the latex is an aqueous dispersion comprising particles of an addition polymer of ethylenically unsaturated monomers; and a stabilizing solution copolymer comprising weak acid containing species and crosslinking species.

In some approaches, the nanogel latex comprises an acrylic copolymer, prepared via solution polymerization, which contain monomers which are completely insoluble in water and thus provides a route for the incorporation of such monomers into a latex. Since the methacrylic acid is only present in the nanogel component, and a non-ionic initiator is employed for the emulsion polymerization stage, the resulting latex should contain lower levels of low molecular weight solution polymer. This will reduce extractibles and may improve the blush resistance of the final lacquer. Typically, nanogels particle size range from 50-100 nm.

As will be understood by one of skill in the art, the combination of monomers and their relative amounts can be adjusted to form latex polymers with different properties, including glass transition temperature (Tg), to allow for modifications in flexibility, hardness, adhesion, particle size, blush resistance, lubrication bloom, abrasion resistance, etc. for different applications. In some instances, the latex polymer of the coating composition disclosed herein has a Fox Tg less than 100° C., less than 90° C., less than 80° C., less than 70° C., less than 60° C., less than 50° C., less than 40° C., less than 30° C., less than 20° C., less than 10° C., less than 5° C., less than 0° C., less than $-10°$ C., or less than $-20°$ C. In some instances, the latex polymer of the coating composition has a Fox Tg greater than $-20°$ C., greater than $-10°$ C., greater than 0° C., greater than 5° C., greater than 10° C., greater than 20° C., greater than 30° C., greater than 40° C., greater than 50° C., greater than 60° C., greater than 70° C., greater than 80° C., greater than 90° C., or greater than 100° C. The latex polymer may also have a Tg within a range between any of the aforementioned values, e.g. a Tg between $-20°$ C. and 5° C., between 20° C. and 60° C., between 10° C. and 100° C., etc. In some approaches, low Tg latexes such as those with Tg's of 50° C. to $-18°$ C. and having Fox Tg 3.7° C. or lower, and of the same monomer make up as the nanogel latex polymer, can be used in conjunction with a nanogel latex polymer to improve flexibility of the finished coating.

The latex polymer may be present in the coating compositions of the disclosure in 30%, 35%, 40%, 45%, 50%, 55%, 60%, 65%, 70%, 75%, or 80%, by weight of the coating compositions, or ranges between any two of these values. For example, the latex polymer may be present in the coating compositions in 40%-70% by weight, in 40%-50% by weight, in 60%-70% by weight, in 45%-65% by weight, or in 50%-60% by weight of the coating composition.

Latex polymers may be prepared, and/or stabilized during polymerization by methods known to those of skill in the art. For example, the methods may include those taught and referenced in, e.g., U.S. Pat. Nos. 9,394,456, 9,181,448, and U.S. Pat. No. 9,404,006, the contents of which are incorporated herein by reference.

In some embodiments, the latex polymer may be neutralized. The neutralizer may include, without limitation, ammonia, a tertiary amine, such as, for non-limiting example, dimethylethanolamine, 2-dimethylamino-2-methyl-1-propanol, tributylamine, morpholine, diethanolamine, triethanolamine, monoethanolamine, sodium hydroxide, potassium hydroxide, lithium hydroxide, and the like, or a combination thereof. In some embodiments, the neutralizer is present in an amount from about 20 to 100% mole-to-mole of acid in the compound to be neutralized.

The latex polymers of the present disclosure may have a relatively homogeneous latex particle structure and/or an inhomogeneous latex particle structure. The latex particle structure may be controlled by the polymerization processes, including for non-limiting example a multi-stage polymerization process. Such particle structures are usually prepared by a series of consecutive emulsion polymerization sequences with different monomer types, where the second stage monomer is polymerized in the presence of seed latex particles.

The latex polymer used in the coating compositions disclosed herein acts as an adhesive component for binding of the coating compositions to the substrate, and to provide chemical resistance. The latex polymer may be any material that imparts adhesive properties, chemical resistance, flexibility, and/or durability to the coating compositions of the disclosure and/or the substrates coated with the coating compositions of the disclosure. In certain embodiments, the latex polymer may be used in combination with a silane to promote adhesion to the substrate. The crosslinker used in the coating compositions disclosed herein in some embodiments may be a hydroxyalkylamide crosslinker. The hydroxyalkylamide crosslinker helps improve corrosion resistance when the coating composition is used as a protective coating that contacts food or beverage. The hydroxyalkylamide crosslinker may include, without limitation, a beta-hydroxyalkyl amide crosslinker, such as Primid® XL-552 (N,N,N',N'-tetrakis-(2-hydroxyethyl)-adipamide), Primid® QM-1260 (N,N,N',N'-tetrakis-(2-hydroxypropyl)-adipamide), and Primid® SF-4510 (EMS-GRILTECH).

In other embodiments, the crosslinker may be an oxazoline crosslinker. Exemplary oxazoline crosslinkers include, but are not limited to, bisoxazolines.

Other crosslinkers that may be used in the coating compositions disclosed herein include phenolics and lignins.

In some embodiments, two or more crosslinkers may be used in combination. The crosslinker(s) may be present in the coating compositions of the disclosure in 0.5%, 1%, 2%, 3%, 4%, 5%, 6%, 7%, 8%, 9%, or 10%, by weight of the coating compositions, or ranges between any two of these values. For example, the crosslinker(s) may be present in the coating compositions in 1%-10% by weight, in 2%-8% by weight, in 2%-5% by weight, in 1%-2% by weight, or in 3%-4% by weight of the coating composition.

The coating compositions of the disclosure include a solvent. The term "solvent" is used herein to refer to water and to organic solvents, alone or as a combination of two or more solvents. Additionally, as used herein, the term "in solution" means in water, in an organic solvent, in a combination of two or more organic solvents, or in a combination of water and one or more organic solvents. Organic solvents may include without limitation xylene, benzene, ethyl benzene, toluene, alkoxy alkanols, methanol, ethanol, propanol, butanol, alkyl ethers of ethylene, alkyl ethers of propylene glycol, ethylene glycol monobutyl ether, ethylene glycol ethyl ether, diethylene glycol monobutyl ether, a ketone, an aromatic solvent, an ester solvent, a hydroxyl functional solvent, and combinations thereof. The amount of the solvent in the coating compositions of the disclosure may be 0.5%, 1%, 2%, 3%, 4%, 5%, 6%, 7%, 8%, 9%, 10%, 11%, 12%, 13%, 14, or 15% by weight of the coating compositions, or ranges between any two of these values. For example, the solvent may be present in the coating compositions in 1%-7% by weight, in 2%-6% by weight, in 2%-4% by weight, in 2%-3% by weight, or in 3%-4% by weight of the composition.

The coating compositions of the disclosure may also optionally include a dispersant. The dispersant used in the coating compositions disclosed herein may be a solution acrylic dispersant. (Solution acrylics are also known as solvent acrylics and are well known in the art.) The solution acrylic dispersant serves to disperse into the water phase any component that does not readily disperse in water. In some instances, without the acrylic dispersant, the coating may separate into two distinct phases. Dispersants (also referred to as surfactants) include liquids that can disperse small droplets or particles. For example, dispersants can include a mixture of emulsifiers and solvents that break oil components into smaller droplets for incorporation throughout the water. Dispersants that can be used include polymeric or oligomeric surfactant based dispersing agents. The solution acrylic dispersant of Example 3 below can be used, for example. Other solution acrylic dispersants useful in the coating compositions of the disclosure are known in the art and are commercially available (e.g., from LUBRIZOL®, Wickliffe, Ohio).

The dispersant may be a phosphate solution polymer, such as EXP2900.

The dispersant can be used in an amount of 0.0%, 0.5%, 1%, 2%, 3%, 4%, 5%, 6%, 7%, 8%, 9%, or 10% by weight of the coating compositions, or ranges between any two of these values. For example, the dispersant may be present in the coating compositions in 0.0%-10% by weight, in 1%-7% by weight, in 2%-6% by weight, in 2%-4% by weight, in 2%-3% by weight, in 3%-4% by weight, or in 3%-6% by weight of the coating composition.

The dispersant may be a solution acrylic dispersant optionally in combination with a silane. Exemplary silanes include without limitation AMEO (3-aminopropyltriethoxysilane), GLYMO (3-glycidyloxypropyltrimethoxysilane), VTEO (vinyltriethoxysilane), and VTMO (vinyltrimethoxysilane).

The coating compositions of the disclosure may also optionally include a lubricant to aid in the coating process. Exemplary lubricants include Aquacer® 1547 and may be present in 0.00%, 0.01%, 0.05%, 0.10%, 0.15%, 0.20%, 0.25%, 0.30%, 0.35%, 0.40%, 0.45%, 0.50%, 0.55%, 0.60%, 0.65%, 0.70%, 0.75%, 0.80%, 0.85%, 0.90%, 1.00%, 1.05%, 1.10%, 1.15%, 1.20%, 1.25%, 1.30%, 1.35%, 1.40%, 1.45%, 1.50%, 1.55%, 1.60%, 1.65%, 1.70%, or 1.75% by weight percent of the coating composition, or ranges between any two of these values. For example, the lubricant may be present in the coating compositions in 0.01%-1.75% by weight, 0.15%-1.50% by weight, 0.15%-1.00% by weight, 0.50%-1.50% by weight, 0.75%-1.25% by weight, or 0.50%-1.25% by weight of the composition.

The coating compositions of the present disclosure may also include acrylic polymers which are miscible in solvent, and further described in Example 3 below.

The coating compositions of the disclosure may also optionally include one or more pigments. For many uses, including food use for a non-limiting example, the pigment may be zinc oxide, carbon black, or titanium dioxide.

The coating compositions can include conventional additives known to those skilled in the art, such as, without limitation, additives to control foam, promote adhesion, reduce equilibrium and dynamic surface tension, or to control rheology and surface lubricity. For example, M amyl alcohol, amyl alcohol, Dowanol PM, water-based silicone free wetting agents, and silicone free and silicone containing defoamers may be used to reduce foaming of the finished coating during application to the substrate. Solvent ratios may also be manipulated to reduce foaming. Neutralizers such as triethanol amine, diethyl amine, dimethylethanol amine, and diethanol amine may be added. Amounts and types of additives can vary depending on desired coating application and performance and are routinely determinable by those skilled in the art.

The coating compositions of the present disclosure are substantially free of formaldehyde, bisphenols, isocyanates, phthalates, and organotins. In certain embodiments, the coating compositions of the disclosure are substantially free of styrene. As used herein, the term "substantially free" means that there is no more than 1.0% by weight, preferably no more than 0.5% by weight, and more preferably no more than 0.1% by weight of the compound, or structural units derived from the compound, present in the coating composition.

The coating compositions of the disclosure may be prepared by, e.g., emulsifying a latex polymer in an aqueous carrier and then dispersing a solution of neutralizer in water into the latex emulsion to form a first solution, dispersing a crosslinker in solution into the first solution to form a second solution, mixing together a hydroxyphenyl functional polymer in solution and optionally a dispersant to form a third solution, mixing the third solution into the second solution, and adding solvent to form the coating composition. One of skill in the art will recognize that depending on the desired coating composition and/or the application thereof, modifications to this process may be warranted. Also, one of skill in the art will understand that, depending on the desired application and other factors, the viscosity of the coating composition may be adjusted, for example by use of 50% DMEA in DI $H_2O$. The viscosity may be of any value; in certain aspects of the disclosure, the viscosity may be 30-70 cps. The composition may be filtered in advance of placing into a container for storage or shipment.

The coating compositions of the disclosure may be used on a substrate to form a coating layer for a variety of applications. The term "substrate" as used herein includes, without limitation, food and beverage packaging and metal packaging, including plastic bottles, cans, metal cans, such as aluminum cans, and specifically aluminum beverage cans, beer and beverage easy-open-ends, aerosol cans, paint cans, industrial drums, packaging, containers, receptacles, or any portions thereof. Also, the terms "substrate," "food can(s)," "food containers," and the like include, for non-limiting example, "can ends," which can be stamped from can end stock and used in the packaging of beverages. As used herein a "coating layer" refers to a contiguous barrier film layer across a substrate. The coating layer comprises a substrate surface, wherein the "substrate surface" is the surface of the coating layer in contact with the substrate, and an upper surface, wherein "upper surface" refers to the surface opposite of the substrate surface, i.e. the surface that will be in contact with the contents of the packaging. For example, when used for a soda can, the substrate surface is the portion of the coating layer in contact with the aluminum can, and the upper surface is the portion of the coating layer in contact with the soda.

One or more coating compositions may be applied in addition to the coating composition of the present disclosure, for non-limiting example, a prime coat may be applied between the substrate and a coating composition of the present disclosure.

The coating compositions of the disclosure can be applied to substrates by conventional methods known in the coating industry, or in any manner known to those skilled in the art. Thus, for non-limiting example, spraying, rolling, dipping, and flow coating application methods can be used for both clear and pigmented films. In some embodiments, the coating compositions are sprayed onto a substrate. When spraying, the coating compositions may contain, for non-limiting example, from about 10% to about 30% by weight of the polymeric solids relative to about 70% to about 90% water and/or other solvents. For some applications, typically those other than spraying, the coating compositions may contain, for non-limiting example, from about 20% to about 60% by weight of the polymer solids. Organic solvents may be utilized in some embodiments to facilitate spray or other application methods and such solvents may include, without limitation, n-butanol, 2-butoxy-ethanol-1, xylene, toluene, and mixtures thereof. In some embodiments, n-butanol is used in combination with 2-butoxyethanol-1.

In some embodiments, after application onto a substrate, the coating compositions may be cured thermally at temperatures in the range from about 215° C. to about 250° C., and alternatively higher for a time sufficient to effect complete curing as well as volatilizing any fugitive components.

For substrates intended as beverage containers, the coating compositions may be applied in some embodiments at a rate in the range from about 0.5 to about 15 milligrams per square inch of polymer coating per square inch of exposed substrate surface. In some embodiments, the coating compositions may be applied at a thickness from about 1 to about 25 microns.

For substrates intended as beverage easy-open-ends, the coating compositions are applied in some embodiments at a rate in the range from about 1.5 to about 15 milligrams of polymer coating per square inch of exposed substrate surface. Conventional packaging coating compositions are applied to metal at about 232° C. to about 247° C. Some of the coating compositions of the current disclosure achieve good results at about 230° C. or below, such as at about 210° C. or below. This decreased temperature provides an energy savings to the coater, and it may allow the use of different alloys, such as tin-plated steel used for easy-open-ends. This also allows for recycling the ends together with the can body.

It has been surprisingly found that when applying and curing the coating compositions of the disclosure onto a substrate, particularly when spray coating the coating compositions onto beverage cans, the hydroxyphenyl functional polymer is not homogenously distributed throughout the coating layer. In particular, there is a gradient of the hydroxyphenyl functional polymer throughout the coating layer, with a greater amount of the hydroxyphenyl functional polymer at upper surface of the coating layer than at the substrate surface. More particularly, the coating layer comprises a first portion comprising the upper surface and a second portion comprising the substrate surface, whereby there is a greater proportion of the hydroxyphenyl functional polymer in the first portion of the coating layer than in the second portion, and whereby there is a greater proportion of the latex polymer in the second portion than in the first portion.

Additionally, the coating compositions of the disclosure have unexpectedly been found to impart favorable flavor scalping properties. In particular, the coating compositions of the disclosure have been found to have comparable, and in some cases better, flavor scalping properties than, e.g., traditional epoxy coatings. Thus, the coating compositions of the disclosure serve as a barrier to migration of flavorants in the contents of the packaging to the coated packaging substrate. Classes of flavorants include aldehydes, ketones, alcohols and acids. Aldehyde flavorants include octanal, nonanal, and decanal. In some embodiments, the coating layer of a cured coating composition of the disclosure exhibits a lower 14-day absorption of one or more of a 1 ppm aqueous solution of octanal, a 1 ppm aqueous solution of nonanal, or a 1 ppm aqueous solution of decanal than a substantially similar coating layer of a cured coating that is substantially free of a hydroxyphenyl functional polymer.

EXAMPLES

Unless otherwise specified, all percentages herein are by weight and refer to the weight of the coating composition.

Example 1

Preparation of Hydroxyphenyl Functional Polymer Solution

A 1 kg batch of 55 wt % poly(hydroxystyrene) was prepared by placing 550 g of 100% solids poly(hydroxystyrene) into a mixing vessel, to which a nitrogen blanket was applied. 183 g Butyl Cellosolve and 267 g Butanol was added to the mixing vessel. The mixture was heated to 116° C. for 3 hours, after which time the mixture was decanted after a slight cool down so that the solution had better flow, but still warm. Poly(hydroxystyrene) supplied in methanol, in ~pH3 water solution, in hydrous form, and in butanol may be used to prepare this dispersion.

Example 2

Preparation of Primid® Solution

To prepare a 1 Kg batch of 30 wt % PRIMID® XL-552 solution, 300 g of PRIMID® XL-552 was combined with 700 g DI H$_2$O in a vessel and mixed until the PRIMID® XL-552 was dissolved.

Example 3

Preparation of Solution Acrylic

To prepare a 1 kg batch, a nitrogen blanket was applied to a mixing vessel. 61.81 g of Butyl Cellosolve (BC) and 139.55 g of butanol was added to the mixing vessel. The mixture was heated to 115° C. A premix of 103.48 g methacrylic acid (MAA), 155.21 g methyl methacrylate (MMA), 16.73 g acrylic acid (90% in DI H$_2$O), 10.95 g Lucidol damped/BP-75-W/Perkadox L-W75, and 50.67 g BC was prepared in a separate premix vessel. The premix was pumped into mixing vessel over a period of 150 minutes while maintaining the temperature at 115-118° C. The premix vessel was rinsed with 24.57 g butanol, which was pumped into the mixing vessel over 30 minutes. 1.37 g TRIGONOX 21/TBPEH was added, followed by addition of 2.3 g butanol, and held for 30 minutes. The addition of TRIGONOX and butanol was repeated. The batch was cooled to 95° C. and 41.89 g dimethyl ethyl amine (DMEA) was added, and held for 15 minutes. 387.81 g DI $H_2O$ was added over 30 minutes. NV should be 29-31% via STM 151.05.01.

Example 4

Preparation of Nanogel Acrylic/Solution Polymer

To prepare a 1 kg batch, nitrogen was passed into a 2000 ml 4-neck round bottom flask to which 168.84 g butyl cellosolve/butyl glycol (BC) was added and heated to 130° C. 101.05 g methyl methacrylate (MMA), 124.24 g butyl acrylate (BA), 33.12 g hydroxypropyl methacrylate (HPMA), 69.57 g methacrylic acid (MAA), 3.32 g allyl methacrylate (AMA), 8.92 g BC, and 1.67 g Azo-bis-(Isobutyronitrile) (AIBN) was mixed in a separate flask and feed into the flask containing butyl cellosolve over 3 hours, maintaining the holding temperature at 130° C., and cooled to 120° C. over 20 minutes. 0.78 g t-Butyl-Per-2-Ethyl-hexanoate (tBPEH) was added to the mixture which was held for 20 minutes, followed by a second addition of 0.78 g tBPEH which was held for 30 minutes. 51.15 g BC followed by 18.04 g Dimethylaminoethanol (DMEA) was added and the mixture was held for 30 minutes while cooling to 100-105° C. Heating was stopped and 418.52 g $DiH_2O$ was added over 45-60 minutes. NV should be 33-35% via STM 151.05.01.

Nanogel acrylic/solution polymers having amounts of MMA, BA, HPMA, MAA, AMA as shown in Table 1 were prepared.

Table 1 shows exemplary nanogel acrylic/solution polymers prepared.

TABLE 1

|  | MMA (wt. % solids) | BA (wt. % solids) | HPMA (wt. % solids) | MAA (wt. % solids) | AMA (wt. % solids) | Fox Tg ° C. |
|---|---|---|---|---|---|---|
| (A) | 29.9 | 36.8 | 13.9 | 19.4 | 0 | 17 |
| (B) | 29.7 | 42.1 | 0 | 27.5 | 0.7 | 30 |
| (C) | 35.3 | 40.4 | 0 | 23.1 | 0.2 | 51 |
| (D) | 31.2 | 35.7 | 0 | 30.1 | 3 | 27 |

Example 5

Preparation of Miniemulsion/Nanogel Latex Polymer

To prepare a 1 kg batch, nitrogen was passed into a 2000 ml 4 neck round bottom flask to which 283.22 g of the nanogel acrylic/solution polymer C in Table 1 of Example 4 and 347.41 g $DiH_2O$ was added, heated to 60° C. and stirred for at least 30 minutes to allow degassing. Separately, 0.51 g ascorbic acid, 0.25 g Dimethylaminoethanol (DMEA), 56.17 g Di $H_2O$, and 0.0008 g Iron II Sulfate [$7.H_2O$] was mixed and added to the flask. The mixture was mixed for 10 minutes to allow temperature to return to 60° C. Separately, 91.10 g cyclohexyl methacrylate (CHMA), 91.10 g methyl methacrylate (MMA), 24.87 g butyl acrylate (BA), 11.18 g glycidyl methacrylate (GMA), and 6.43 g allyl methacrylate (AMA) was mixed and added to the flask, mixed for 20 minutes while maintaining temperature at 60° C. 71.33 g $DiH_2O$ was fed into the mixture over 10 minutes. 1.43 g t-butyl hydroperoxide [70%] was added, followed by 7.13 g $DiH_2O$ which was used to wash out the vessel used to measure the t-butyl hydroperoxide. The mixture exothermed to about 80° C., and was cooled back down to 60° C. while mixing for 30 minutes. An additional 0.71 g t-Butyl Hydroperoxide, again washing the vessel with 7.13 g $DiH_2O$ was added, held at 60° C. for 60 minutes then cooled and filtered. NV should be 31-33% via STM 151.05.01.

A 90,000-120,000 molecular weight PVB was also used in combination with the nanogel acrylic/solution polymer at 5%, 15%, and 25% of the solution for use in the miniemulsion/nanogel latex of Example 5.

Ratios of CHMA, MMA, BA, AMA, and GMA were altered to change Tg to allow for improved scalping (increased hardness) or improved flexibility. For the same reasons the ratio of nanogel acrylic/solution polymer: miniemulsion/nanogel latex was altered. Some changes to the monomer levels were also made to improve the flow and reduce foaming. BDDMA, GDMA, and EGDMA were all used as replacements for AMA and/or GMA. BNM was used as a replacement for CHMA to change the hardness and environmental resistances of the coating. Degree of Neutralization (DoN) has been varied from the standard 25% down to the 15% in tests to determine the effect of this on particle size as well as for the effect of changed particle size on the finished blend and its performance.

Table 2 shows exemplary miniemulsion/nanogel latex polymers prepared.

TABLE 2

|  | CHMA (wt. % solids) | MMA (wt. % solids) | BA (wt. % solids) | AMA (wt. % solids) | GMA (wt. % solids) | Fox Tg ° C. | BDDMA (wt. % solids) | GDMA (wt. % solids) | EGDMA (wt. % solids) | Nanogel: Emulsion Ratio | BNM (wt. % solids) |
|---|---|---|---|---|---|---|---|---|---|---|---|
| (A) | 0 | 0 | 10 | 0 | 0 | 35 | 0 | 0 | 0 | 20:80 | 40 |
| (B) | 20.25 | 20.5 | 10.5 | 10.6 | 18.6 | 55 | 7.7 | 7.8 | 2.9 | 30:70 | 40.4 |
| (C) | 22.5 | 31.2 | 10.7 | 2.7 | 5 | 76 | 0 | 0 | 3.95 | 33:67 | 0 |
| (D) | 25.5 | 35 | 10.8 | 2.8 | 5.1 | 90 | 0 | 0 | 5 | 35:65 | 0 |
| (E) | 31.2 | 36.2 | 10.9 | 2.85 | 7.9 | 11 | 0 | 0 | 6.8 | 40:60 | 0 |
| (F) | 33 | 36.9 | 11 | 2.9 | 5 | 54 | 0 | 0 | 7.9 | 45:55 | 0 |
| (G) | 35 | 39.4 | 11.1 | 3 | 5 | 68 | 0 | 0 | 8 | 50:50 | 0 |

Example 6

Preparation of Coating Composition

Polyhydroxystyrene from Example 1, Primid solution from Example 2, solution acrylic from Example 3, silane (AMEO), and latex were combined in amounts as shown in Table 3 to prepare coating compositions CC-01, CC-02, and CC-03, with coating composition CC-03 further containing nanogel solution B from Example 5.

To prepare a 1 KG batch of CC-03, 493 g of the nanogel latex polymer B from Table 2 of Example 5 was poured into a mixing vessel at room temperature. Separately, 181.18 g DI $H_2O$ and 5.02 g Dimethyl Ethyl Amine (DMEA) were mixed to disperse the DMEA in the DI $H_2O$, and then added to the primary mixing vessel. 23.37 g of the Primid solution of Example 2, was added. The solution acrylic of Example 3, and the poly (hydroxystyrene) of Example 1 were separately mixed, to which silane (AMEO) was added to prepare a premix, which is then added to the primary vessel.

33.687 g Butyl Cellosolve (BC) is then added, followed by 43.98 g Butanol. Lastly, 165.30 g DI $H_2O$ is added and the batch is mixed for an additional 15 minutes and then the viscosity is measured.

Table 3 shows exemplary coating compositions prepared and evaluated.

TABLE 3

| Latex (wt. % solids) | Solution Acrylic (wt % solids) | Nano-gel (wt. % solids) | Primid Amount (wt. % solids) | Poly (hydroxy-styrene) (wt. % solids) | Silane or like substance (wt. % solids) | Blend Identifier |
|---|---|---|---|---|---|---|
| 81.81 | 6.99 | 0 | 1 | 7.2 | 3 | CC-01 |
| 81.81 | 9.9 | 0 | 3.69 | 3.6 | 1 | CC-02 |
| 46.81 | 6.3 | 35 | 3.69 | 7.2 | 1 | CC-03 |

Example 7

Analysis of Flavor Scalping Properties

Utilizing a three aldehyde test, the flavor scalping performance of the coating compositions of the disclosure were analyzed. In the test, the concentration of three different aldehydes in solution was monitored when exposed to a beverage can coating. A loss in concentration of one or more of these aldehydes suggests poor flavor scalping performance which could have a detrimental effect on the flavor of the beverage during storage.

The aldehydes of interest are octanal, nonanal and decanal. It is thought that these compounds are representative of the flavors commonly found in soft drinks and therefore monitoring the loss of these in solution acts as an indicator of coating performance.

Sample analysis was performed by means of gas chromatography ion mobility spectroscopy (GC-IMS), which is able to measure compounds at low ppm levels while producing reproducible, reliable results. Samples were placed in 20 mL headspace vials and warmed to 60° C. to increase the volatiles in the headspace. The headspace of each sample was measured and the amount of aldehyde present was quantified. Further details are provided below.

Sample Preparation

All solutions were prepared gravimetrically and all weights were recorded. 5.3 g of 85% $H_3PO_4$ was combined with 4.7 g of DI $H_2O$ to give an ~45% $H_3PO_4$ solution. 1.0 ML of this solution was added to 4.0 L of freshly opened HPLC grade water to create stock acidified water matrix. 0.120 mL of each aldehyde (octanal, nonanal, decanal) was combined with 7.89 g (10 mL) of anhydrous ethanol to give a combined stock aldehyde solution of ~10,000 ppm of each aldehyde. 0.4 mL of this stock aldehyde solution was combined with 4.0 L of acidified water matrix to give ~1 ppm of aldehyde sampling solution.

Three cans per variable, per time point were filled with 355 g (fill volume 355 mL) and were seamed using the hand seamer (Dixie Canner, USA), followed by incubation at 40° C. for an allotted time period. After incubation the cans were opened and a 1 mL aliquot was taken from each can and placed into 20 mL headspace vials, prior to GC-IMS analysis. The solution from each can was measured in triplicate.

Control cans for each coating tested were prepared by filling the beverage can with the aldehyde solutions, sealing the can using the can seamer and then opening the can and removing 1 mL of solution for analysis. These cans were not incubated. This was repeated for each coating variable. Both the control can and the original bottled solution were analyzed in triplicate to determine what losses, if any where observed from initial can filling.

Calibration Series

All solutions were prepared gravimetrically and all weights were recorded.

5.3 g of 85% $H_3PO_4$ was combined with 4.7 g of DI $H_2O$ to give an ~45% $H_3PO_4$ solution. 1.0 mL of this solution was added to 4.0 L of freshly opened HPLC grade water to create stock acidified water matrix.

0.120 mL of each aldehyde (octanal, nonanal, decanal) was combined with 7.89 g (10 mL) of anhydrous ethanol to give a combined stock aldehyde solution of ~10,000 ppm of each aldehyde. 0.4 mL of this stock aldehyde solution was combined with 4.0 L of acidified water matrix to give ~1 ppm of aldehyde sampling solution.

A serial dilution of the three aldehyde solution using acidified water matrix as the diluent was performed to obtain 10 mL of each: 1.0, 0.8, 0.6, 0.5, 0.3, 0.2, 0.1 ppm in triplicate for calibration. 1 mL of sample was pipetted into a 20 mL headspace vial and sealed with a gas tight screw cap prior to sample analysis.

GC-IMS Parameters

No sample pre-concentration was performed prior to IMS sample analysis. 1 mL of sample was pipetted into a 20 mL headspace vial and sealed with a gas tight screw cap prior to sample analysis. A summary of the parameters and experimental conditions employed can be found in Table 4.

TABLE 4

| | |
|---|---|
| Column type | MCC - 20 cm length, OV-5 |
| Column temperature (° C.) | 45 |
| Column carrier gas flow rate (mL/min) | 2 for 2 min, 50 for 3 min, 150 for 10 min, (10_MIN RAMP) |
| Drift gas flow rate (mL/min) | 150 |
| Drift gas/carrier gas | Synthetic air |
| IMS temperature (° C.) | 45 |
| Injector temperature (° C.) | 80 |
| Automatic headspace sample injection unit | |
| Injected sample volume (μL) | 250 |
| Incubation temperature (° C.) | 60 |
| Incubation time (min) | 20 |

Results

All the samples were analyzed by means of GC-IMS in order to quantify the amount of aldehydes present in a solution which had been stored and incubated in a beverage can. Coating compositions of the present disclosure, CC-01, CC-02, CC-03 were compared with Epoxy (Aqualure® 2000), BPANI A (Aqualure® G1 50) to assess differences in performance over a 14 day time period.

Beverage cans applied with these coating were filled with an aldehyde solution containing octanal, nonanal and decanal at 1 ppm respectively and incubated at 40° C. for up to 14 days. The concentrations of the individual aldehydes were quantified by means of GC-IMS.

The calculated concentrations of octanal, nonanal and decanal in the solutions stored in the different beverage can coatings are shown in Table 5, Table 6, and Table 7 respectively. Three beverage cans were measured three times each for every time point resulting in nine data points for each concentration displayed in the tables below. The exception to this is measurements for the epoxy beverage cans, for which only one can per time point was used so those concentrations are an average of three measurements. The measurements and the can replicates show good reproducibility reflected by the low standard deviation values. Any differences observed among the aldehyde concentrations and among the different can coatings are considered significant as differences are greater than the standard deviation. The data shown in Tables 8-10 has been normalized to the epoxy control can to simplify interpretation. A summary of the corresponding absolute values can be found in Table 5, Table 6, and Table 7.

A comparison of the aldehyde concentrations stored in different beverage cans is shown in Tables 8-10 (normalized data) and Tables 5-7 (absolute value data). The individual aldehydes have been separated to allow the performance of the different coatings to be evaluated. The bottle solution is the solution made in 4 L water bottles that the aldehyde stock solution was added too. This solution was then poured into the beverage cans and the cans were sealed prior to incubation in an oven. The control can (time point 0), was a can filled with the aldehyde solution, sealed and then re-opened and its contents analyzed. It is interesting to note that there is a difference in concentration between the bottle solution and the control can solution with on average an 8% loss of octanal, a 20% loss of nonanal and a 26% loss of decanal when the aldehyde solution is initially packed into a can. This suggests that the aldehydes are either lost during the transfer of the solution into the can, or that the aldehydes adhere to the surface of the coating and cannot be retrieved.

A comparison of the five different coatings with respect to octanel loss suggests there is little difference among the performances of the coatings. The epoxy coating appears to lose the greatest amount of octanal, 12%, whereas the coating compositions of the disclosure lose 9% according to normalized data. In contrast, there is a significant greater loss of nonanal and decanal from all of the coatings over the 14 day period. The nonanal concentration decreases by 46% when exposed to the BPANI A coating, but only decreases by 31% in the CC-03 beverage cans. The concentration of nonanal in the epoxy coating decreases by 38%. The epoxy coating is considered the "gold standard" coating, therefore any losses in aldehyde concentration should be compared to this. Both CC-02 and CC-03 have similar or better performance than the epoxy.

In summary, there was a loss of all aldehydes in all of the beverage can coatings tested. The overall performance of coating CC-03 is equal to and/or better than the epoxy coating in terms of aldehyde loss. The coating with the highest percentage loss of aldehydes is BPANI A. The trend of aldehyde loss in all coatings shows minimal loss of octanal and increasing losses of nonanal and decanal. The epoxy and CC-03 coatings showed a 50% loss of decanal, whereas the decanal concentration in BPANI A decreased by 75%. Coatings CC-01 and CC-02 had equal performances with respect to the aldehyde test throughout.

TABLE 5

Summary of the concentration of octanal in the aldehyde solution after incubation and aging. The concentration of the octanal in the solution decreased over time with the percentage decrease from control can to day 14 indicated by an arrow. Each different can coating experienced a loss in aldehyde concentration. The epoxy coating is used as a control and indicates what is an acceptable loss.

Octanal concentration (ppm)

| Day | Epoxy | stdev | % diff Day 0-Day 14 | BPANIA | stdev | % diff Day 0-Day 14 | CC-01 | stdev | % diff Day 0-Day 14 | CC-02 | stdev | % diff Day 0-Day 14 | CC-03 | stdev | % diff Day 0-Day 14 |
|---|---|---|---|---|---|---|---|---|---|---|---|---|---|---|---|
| Bottle Soln | 3.4 | 0.04 | | 3.2 | 0.21 | | 3.1 | 0.07 | | 3.2 | 0.04 | | 2.9 | 0.07 | |
| 0 | 3.3 | 0.03 | 12% | 2.9 | 0.15 | 10% | 2.8 | 0.06 | 7% | 2.7 | 0.05 | 7% | 2.8 | 0.08 | 7% |
| 1 | 3.0 | 0.02 | ↓ | 2.8 | 0.13 | ↓ | 2.6 | 0.14 | ↓ | 2.8 | 0.07 | ↓ | 2.8 | 0.06 | ↓ |
| 5 | 3.1 | 0.03 | | 2.8 | 0.09 | | 2.6 | 0.09 | | 2.8 | 0.07 | | 2.5 | 0.14 | |
| 7 | 2.2 | 0.10 | | 2.3 | 0.06 | | 2.4 | 0.08 | | 2.4 | 0.08 | | 2.5 | 0.14 | |
| 10 | 2.9 | 0.06 | | 2.6 | 0.10 | | 2.6 | 0.06 | | 2.4 | 0.05 | | 2.2 | 0.09 | |
| 14 | 2.9 | 0.05 | | 2.6 | 0.09 | | 2.6 | 0.08 | | 2.5 | 0.05 | | 2.6 | 0.07 | |

TABLE 6

Summary of the concentration of nonanal in the aldehyde solution after incubation and aging. The concentration of the nonanal in the solution decreased over time with the percentage decrease from control can to day 14 indicated by an arrow. Each different can coating experienced a loss in aldehyde concentration. The epoxy coating is used as a control and indicates what is an acceptable loss.
Nonanal concentration (ppm)

| Day | Epoxy | stdev | % diff Day 0-Day 14 | BPANIA | stdev | % diff Day 0-Day 14 | CC-01 | stdev | % diff Day 0-Day 14 | CC-02 | stdev | % diff Day 0-Day 14 | CC-03 | stdev | % diff Day 0-Day 14 |
|---|---|---|---|---|---|---|---|---|---|---|---|---|---|---|---|
| Bottle Soln | 1.5 | 0.04 | | 1.4 | 0.14 | | 1.4 | 0.06 | | 1.5 | 0.03 | | 1.2 | 0.03 | |
| 0 | 1.3 | 0.01 | 39% | 1.2 | 0.10 | 50% | 1.1 | 0.04 | 46% | 1.0 | 0.03 | 40% | 1.0 | 0.13 | 30% |
| 1 | 0.9 | 0.03 | ↓ | 0.9 | 0.07 | ↓ | 0.7 | 0.07 | ↓ | 0.6 | 0.07 | ↓ | 0.8 | 0.04 | ↓ |
| 5 | 0.9 | 0.05 | | 0.7 | 0.04 | | 0.6 | 0.05 | | 0.7 | 0.04 | | 0.7 | 0.09 | |
| 7 | 0.7 | 0.05 | | 0.6 | 0.03 | | 0.6 | 0.02 | | 0.6 | 0.03 | | 0.7 | 0.09 | |
| 10 | 0.8 | 0.04 | | 0.6 | 0.05 | | 0.6 | 0.02 | | 0.5 | 0.03 | | 0.5 | 0.05 | |
| 14 | 0.8 | 0.04 | | 0.6 | 0.04 | | 0.6 | 0.07 | | 0.6 | 0.03 | | 0.7 | 0.03 | |

TABLE 7

Summary of the concentration of decanal in the aldehyde solution after incubation and aging. The concentration of the decanal in the solution decreased over time with the percentage decrease from control can to day 14 indicated by an arrow. Each different can coating experienced a loss in aldehyde concentration. The epoxy coating is used as a control and indicates what is an acceptable loss.
Decanal concentration (ppm)

| Day | Epoxy | stdev | % diff Day 0-Day 14 | BPANIA | stdev | % diff Day 0-Day 14 | CC-01 | stdev | % diff Day 0-Day 14 | CC-02 | stdev | % diff Day 0-Day 14 | CC-03 | stdev | % diff Day 0-Day 14 |
|---|---|---|---|---|---|---|---|---|---|---|---|---|---|---|---|
| Bottle Soln | 1.1 | 0.02 | | 0.9 | 0.18 | | 0.9 | 0.13 | | 1.1 | 0.04 | | 0.6 | 0.03 | |
| 0 | 0.8 | 0.02 | 50% | 0.7 | 0.10 | 71% | 0.6 | 0.03 | 67% | 0.7 | 0.03 | 67% | 0.6 | 0.12 | 50% |
| 1 | 0.6 | 0.04 | ↓ | 0.6 | 0.07 | ↓ | 0.3 | 0.04 | ↓ | 0.2 | 0.05 | ↓ | 0.4 | 0.03 | ↓ |
| 5 | 0.5 | 0.05 | | 0.4 | 0.03 | | 0.3 | 0.03 | | 0.2 | 0.03 | | 0.3 | 0.03 | |
| 7 | 0.5 | 0.03 | | 0.4 | 0.02 | | 0.3 | 0.02 | | 0.2 | 0.02 | | 0.3 | 0.03 | |
| 10 | 0.4 | 0.02 | | 0.3 | 0.04 | | 0.3 | 0.04 | | 0.2 | 0.02 | | 0.2 | 0.04 | |
| 14 | 0.4 | 0.03 | | 0.2 | 0.02 | | 0.2 | 0.03 | | 0.2 | 0.02 | | 0.3 | 0.03 | |

TABLE 8

Summary of the concentration of octanal in the aldehyde solution after incubation and aging. The concentration of the octanal in the solution decreased over time with the percentage decrease from control can to day 14 indicated by an arrow. Each different can coating experienced a loss in aldehyde concentration. The epoxy coating is used as a control and indicates what is an acceptable loss. All values have been normalized to the epoxy control can.
Octanal concentration-values normalized to Epoxy control can (ppm)

| Day | Epoxy | stdev | % diff Day 0-Day 14 | BPANIA | stdev | % diff Day 0-Day 14 | CC-01 | stdev | % diff Day 0-Day 14 | CC-02 | stdev | % diff Day 0-Day 14 | CC-03 | stdev | % diff Day 0-Day 14 |
|---|---|---|---|---|---|---|---|---|---|---|---|---|---|---|---|
| 0 | 3.3 | 0.03 | Loss | 3.3 | 0.15 | Loss | 3.3 | 0.06 | Loss | 3.3 | 0.05 | Loss | 3.3 | 0.08 | Loss |
| 1 | 3.0 | 0.02 | 12% | 3.2 | 0.13 | 12% | 3.1 | 0.14 | 12% | 3.3 | 0.07 | 9% | 3.3 | 0.06 | 9% |
| 5 | 3.1 | 0.03 | ↓ | 3.1 | 0.09 | ↓ | 3.0 | 0.09 | ↓ | 3.3 | 0.07 | ↓ | 3.0 | 0.14 | ↓ |
| 7 | 2.2 | 0.10 | | 2.6 | 0.06 | | 2.8 | 0.08 | | 2.9 | 0.08 | | 3.0 | 0.14 | |
| 10 | 2.9 | 0.06 | | 3.0 | 0.10 | | 3.0 | 0.06 | | 2.9 | 0.05 | | 2.6 | 0.09 | |
| 14 | 2.9 | 0.05 | | 2.9 | 0.09 | | 3.0 | 0.08 | | 3.0 | 0.05 | | 3.0 | 0.07 | |

TABLE 9

Summary of the concentration of nonanal in the aldehyde solution after incubation and aging. The concentration of the nonanal in the solution decreased over time with the percentage decrease from control can to day 14 indicated by an arrow. Each different can coating experienced a loss in aldehyde concentration. The epoxy coating is used as a control and indicates what is an acceptable loss. All values have been normalized to the epoxy control can.
Nonanal concentration-values normalized to Epoxy control can (ppm)

| Day | Epoxy | stdev | % diff Day 0-Day 14 | BPANIA | stdev | % diff Day 0-Day 14 | CC-01 | stdev | % diff Day 0-Day 14 | CC-02 | stdev | % diff Day 0-Day 14 | CC-03 | stdev | % diff Day 0-Day 14 |
|---|---|---|---|---|---|---|---|---|---|---|---|---|---|---|---|
| 0  | 1.3 | 0.01 | 38% | 1.3 | 0.10 | 46% | 1.3 | 0.04 | 38% | 1.3 | 0.03 | 38% | 1.3 | 0.13 | 31% |
| 1  | 0.9 | 0.03 | ↓   | 1.0 | 0.07 | ↓   | 0.9 | 0.07 | ↓   | 0.8 | 0.07 | ↓   | 1.1 | 0.04 | ↓   |
| 5  | 0.9 | 0.05 |     | 0.9 | 0.04 |     | 0.8 | 0.05 |     | 0.8 | 0.04 |     | 0.9 | 0.09 |     |
| 7  | 0.7 | 0.05 |     | 0.7 | 0.03 |     | 0.8 | 0.02 |     | 0.7 | 0.03 |     | 0.9 | 0.09 |     |
| 10 | 0.8 | 0.04 |     | 0.7 | 0.05 |     | 0.8 | 0.02 |     | 0.7 | 0.06 |     | 0.7 | 0.05 |     |
| 14 | 0.8 | 0.04 |     | 0.7 | 0.04 |     | 0.8 | 0.07 |     | 0.8 | 0.03 |     | 0.9 | 0.03 |     |

TABLE 10

Summary of the concentration of decanal in the aldehyde solution after incubation and ageing. The concentration of the decanal in the solution decreased over time with the percentage decrease from control can to day 14 indicated by an arrow. Each different can coating (as indicated by different colors) experienced a loss in aldehyde concentration, the epoxy coating (red) is used as a control and indicates what is an acceptable loss. All values have been normalized to the epoxy control can.
Decanal concentration-values normalized to Epoxy control can (ppm)

| Day | Epoxy | stdev | % diff Day 0-Day 14 | BPANIA | stdev | % diff Day 0-Day 14 | CC-01 | stdev | % diff Day 0-Day 14 | CC-02 | stdev | % diff Day 0-Day 14 | CC-03 | stdev | % diff Day 0-Day 14 |
|---|---|---|---|---|---|---|---|---|---|---|---|---|---|---|---|
| 0  | 0.8 | 0.02 | Loss | 0.8 | 0.10 | Loss | 0.8 | 0.03 | Loss | 0.8 | 0.03 | Loss | 0.8 | 0.12 | Loss |
| 1  | 0.6 | 0.04 | 50%  | 0.6 | 0.07 | 75%  | 0.4 | 0.04 | 63%  | 0.3 | 0.05 | 63%  | 0.5 | 0.03 | 50%  |
| 5  | 0.5 | 0.05 | ↓    | 0.4 | 0.03 | ↓    | 0.3 | 0.03 | ↓    | 0.3 | 0.03 | ↓    | 0.4 | 0.03 | ↓    |
| 7  | 0.5 | 0.03 |      | 0.4 | 0.02 |      | 0.4 | 0.02 |      | 0.2 | 0.02 |      | 0.4 | 0.03 |      |
| 10 | 0.4 | 0.02 |      | 0.3 | 0.04 |      | 0.3 | 0.04 |      | 0.2 | 0.02 |      | 0.3 | 0.04 |      |
| 14 | 0.4 | 0.03 |      | 0.2 | 0.02 |      | 0.3 | 0.03 |      | 0.3 | 0.02 |      | 0.4 | 0.03 |      |

Example 8

Analysis of Coated Surface

Figure 1:
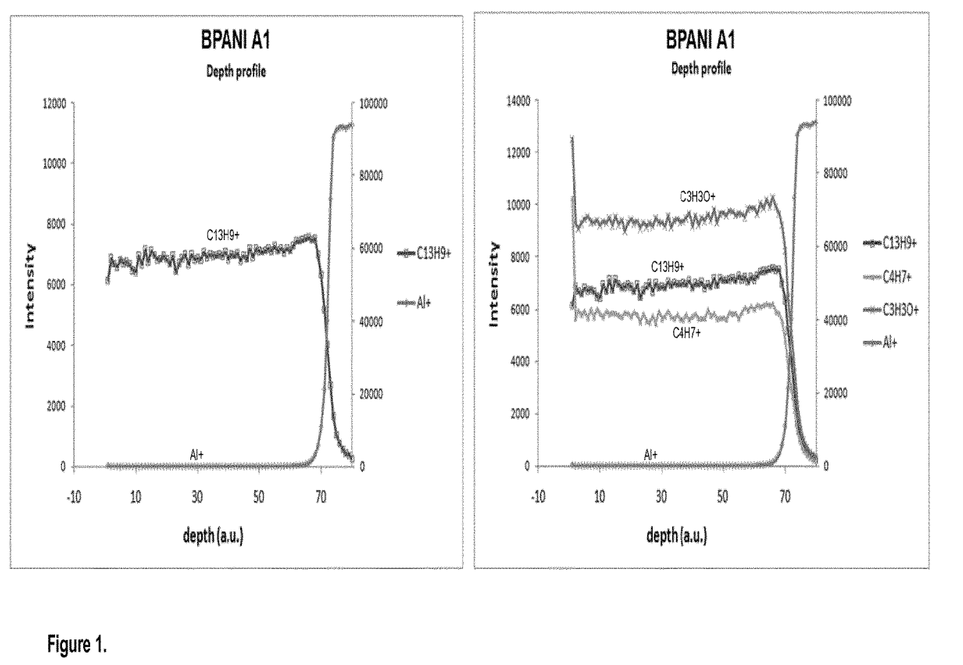
FIG. 1 shows the TOF-SIMS depth profile results of BPANI A1 coated surfaces.
Figure 2:
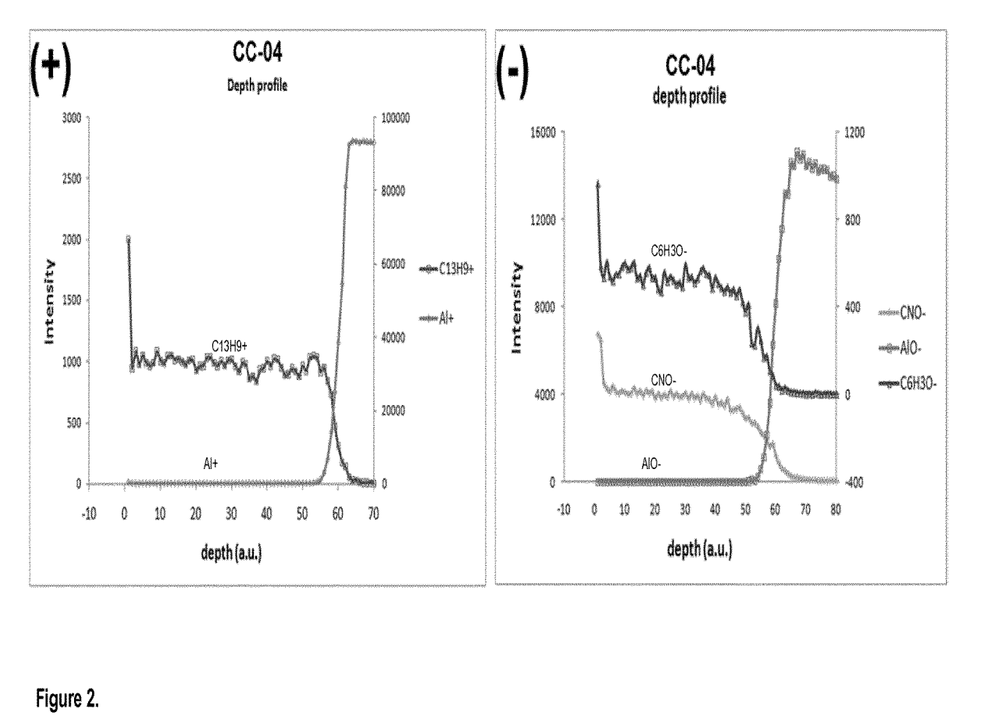
FIG. 2 shows the TOF-SIMS depth profile results of CC-04 coated surfaces.
Figure 3:
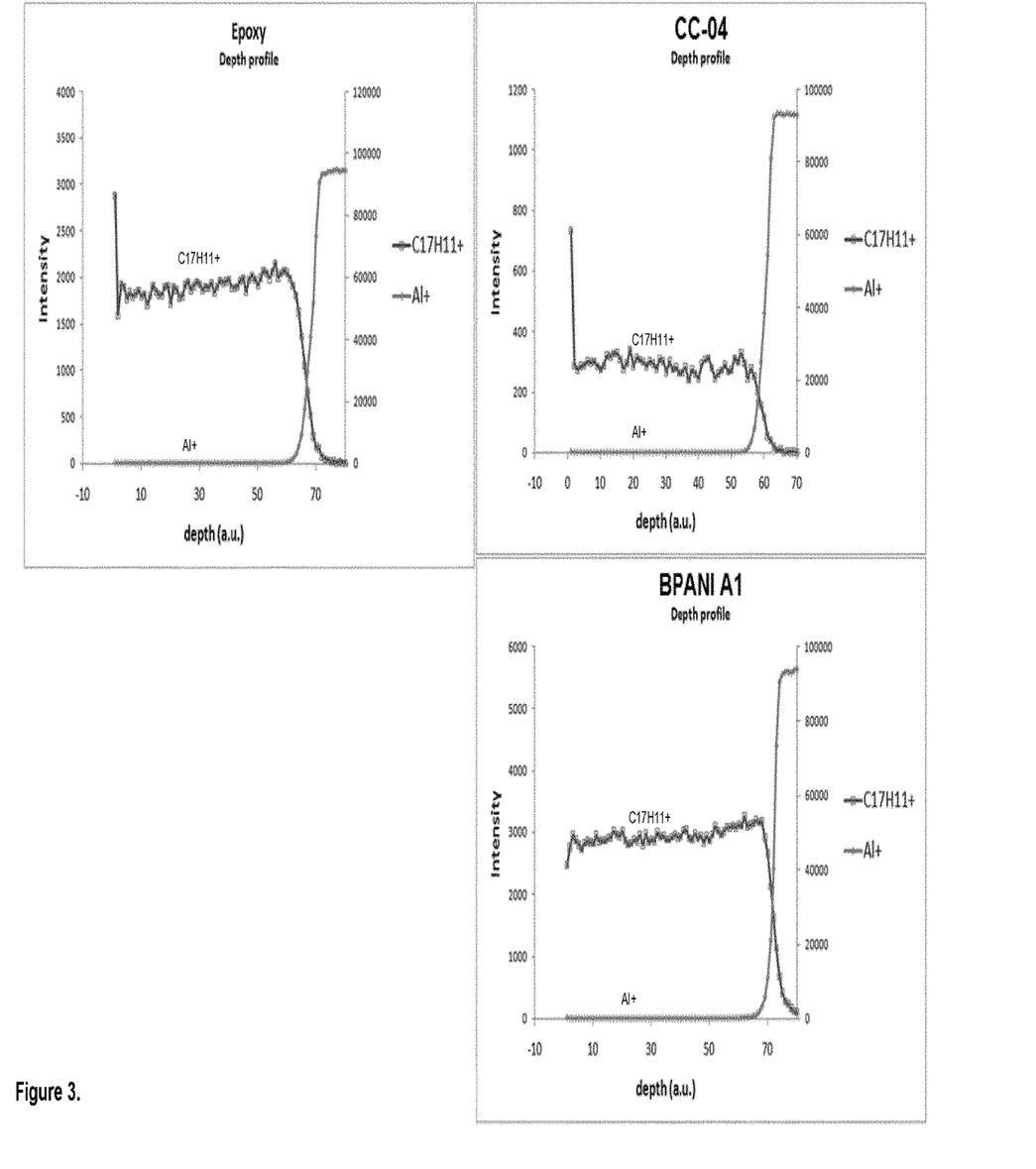
FIG. 3 shows a comparison of TOF-SIMS depth profile results of Epoxy, BPANI A1, and CC-04.

Time-of-Flight Secondary Ion Mass Spectrometry (TOF-SIMS) was used to analyze the surface of substrates coated with the coating compositions of the disclosure. TOF-SIMS is a surface analytical technique that can be used for depth profiling, i.e. analyzing the variation in the composition of a coating on a substrate 1-2 nm below the initial surface. This study analyzed the in-depth distribution of aromatic species in the coating compositions of the disclosure when used as can coatings, along with that of epoxy coatings and other can coatings.

For each coated beverage can analyzed, 2 different locations were selected for analysis: at ¼ and ¾ of the sidewall. Coatings analyzed include Epoxy (Aqualure® 2000), BPANI A1 (Aqualure® G1 50), and CC-04, a coating composition of the disclosure (78.5 wt. % latex, 5 wt. % Primid, 5 wt. % Silane, and 7.5 wt. % poly(hydroxy styrene), prepared in accordance with the methods disclosed above).

Epoxy surface vs. bulk content was assessed. The outer surface (i.e. upper surface) of the epoxy coating was found to be enriched with an aromatic hydrocarbon compound with a spectral resemblance to polystyrene (PS); there was no evidence of BPA surface enrichment. Depth profiles indicated surface depletion of BPA and 1.5-2x surface enrichment of PS-type of compound. The thickness of the modified outer layer is less than 60 nm (assuming total film thickness of 4 micron) and the bulk of the coating is homogeneous in BPA and PS-types of compound. The same trends are observed in negative polarity.

For BPANI A1, the chemical composition of bulk and surface is very similar for the mass region 150-270 amu (i.e. mass region where for epoxy coating some clear differences are present); the pattern points to PS type of species. The surface was enriched in aliphatic species/fragments (C2H5+, C3H5+, C4H7+, C5H9+, C6H11+, C7H11+) and O-containing species/fragments (C2H5O+, C3H7O+, C4H7O+, C5H7O+, C6H7O+, C7H9O+, C2H3O2+, C4H4O2+, C5H5O2+, C6H7O2+). With BPANI A1, the aromatic species has a homogeneous in-depth distribution, i.e. no surface enrichment was observed as was for epoxy. Aliphatic and O-containing species were enriched at outer surface of BPANI A1 (<60 nm) and profiles in negative polarity confirm a flat profile for aromatic species.

For CC-04 the outer surface was found to be enriched in a species closely related to polystyrene (highly aromatic polymer), i.e. PB5, which was similar to epoxy. There was a surface enrichment of aromatic/hydroxy-styrenic species with a factor 1.5-2 as compared to the bulk (depth profiles, both polarities). In negative polarity the number of specific fragments is less than in the positive polarity. For CC-04, the relative surface enrichment of aromatics is higher than for epoxy.

To summarize, for epoxy, a thin surface layer (<60 nm) is present which is enriched in PS type of material and depleted in BPA. Further in-depth, the coating chemical composition is homogeneous. For BPANI A1, there was no surface enrichment of aromatic species observed, but surface enrichment of an O-containing and aliphatic hydrocarbon compound. For CC-04, the outer surface of the film is 1.5-2 times enriched in PB5 as compared to the bulk; no full phase separation (stratification) between PB5 and the other compounds could be established.

We claim:

1. A coating composition comprising:
   a hydroxyphenyl functional polymer, wherein the hydroxyphenyl functional polymer is a poly(hydroxystyrene);
   a latex polymer; and
   a crosslinker.

2. The coating composition of claim 1, wherein the hydroxyphenyl functional polymer is functionalized with one or more functional groups selected from the group consisting of acetal, acrylate, methacrylate, aldehyde, alkyl, alkoxy, amide, aryl, carbamate, carboxylate, halogen, hydroxyalkyl, hydroxyalkyl amide, oxazoline, azlactone, hydroxyl, isocyanate, ketone, methacrylate, nitrile, nitro, sulfide, sulfone, thiol, urethane, alkylvinyl, and vinyl.

3. The coating composition of claim 1, wherein the poly(hydroxystyrene) comprises linear and/or branched poly(hydroxystyrene).

4. The coating composition of claim 1, wherein the poly(hydroxystyrene) has a number average molecular weight of 500-3000 Da.

5. The coating composition of claim 1, wherein the poly(hydroxystyrene) is present in 0.1%-10% by weight of the coating composition.

6. The coating composition of claim 1, wherein the latex polymer is (meth)acrylic.

7. The coating composition of claim 1, wherein the latex polymer is present in 40%-70% by weight of the coating composition.

8. The coating composition of claim 1, wherein the crosslinker is a beta-hydroxyalkyl amide.

9. A coated substrate comprising a layer of a coating composition which comprises
   a hydroxyphenyl functional polymer, wherein the hydroxyphenyl functional polymer is a poly(hydroxystyrene);
   a latex polymer; and
   a crosslinker.

10. The coated substrate of claim 9, wherein the substrate is an aluminum beverage can.

11. A method of preparing a coated substrate comprising applying and curing a layer of a coating composition onto the surface of the substrate, wherein the coating composition comprises:
    a hydroxyphenyl functional polymer, wherein the hydroxyphenyl functional polymer is a poly(hydroxystyrene);
    a latex polymer; and
    a crosslinker.

12. The method of claim 11, wherein the substrate is a beverage can.

* * * * *